United States Patent Office 3,562,016
Patented Feb. 9, 1971

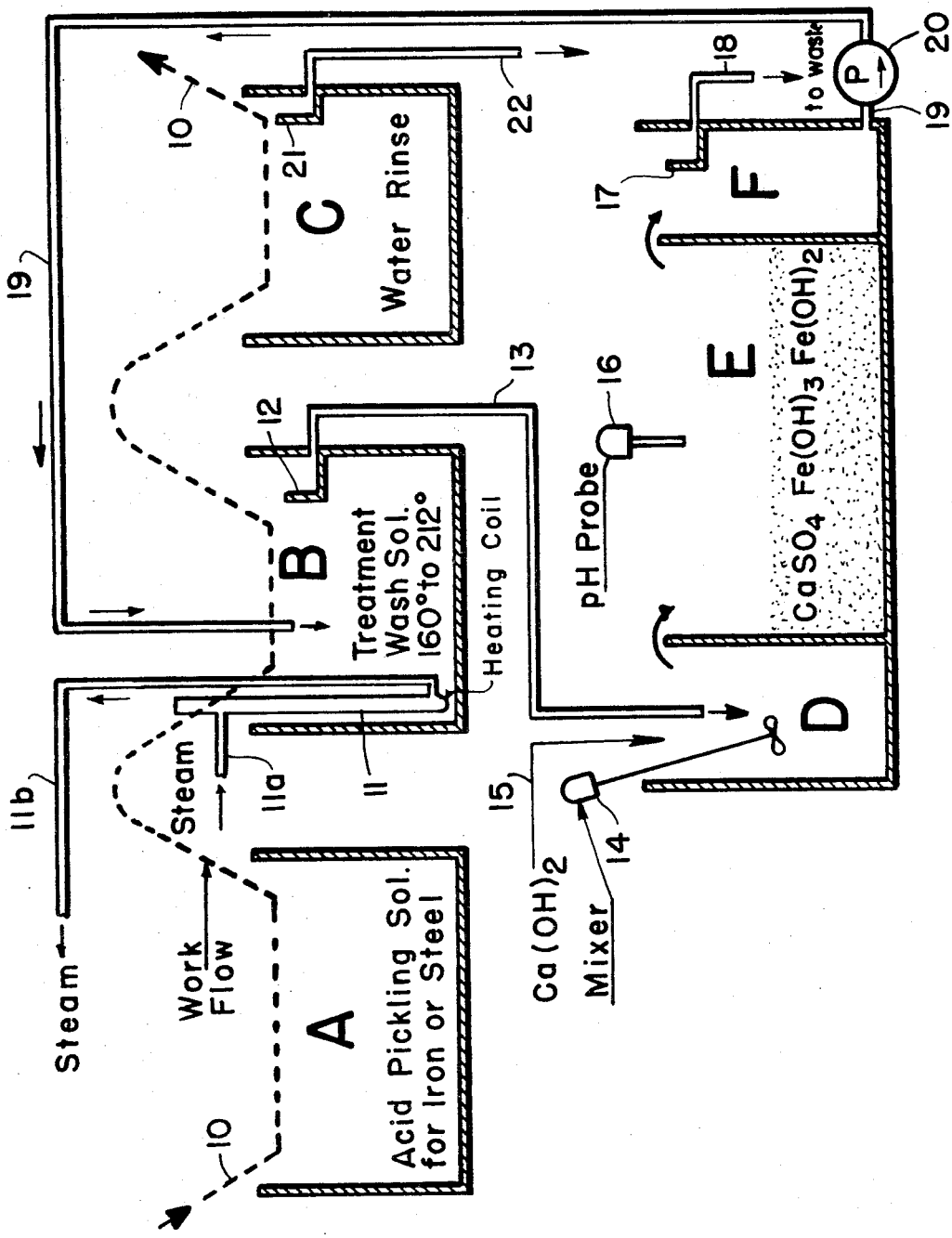

3,562,016
CONTINUOUS TREATMENT OF CARRY-OVER ON
FERROUS METAL WORKPIECES
Leslie E. Lancy, Ellwood City, Pa., assignor to Lancy
Laboratories, Inc., Zelienople, Pa., a corporation of
Pennsylvania
Filed July 5, 1968, Ser. No. 742,747
Int. Cl. B01d 21/00; C02b 1/30; C02c 5/00
U.S. Cl. 134—13                              6 Claims

ABSTRACT OF THE DISCLOSURE

Ferrous metal-containing workpieces which have been subjected to a pickling or other treatment in an acid bath have potentially polluting iron salt waste or carry-over solution on their surfaces that is fully reacted and neutralized by a calcium containing aqueous chemical solution, without forming undesirable calcium deposits and while enabling efficient precipitation of iron compounds. The workpiece may be subsequently subjected to a rinse water wash without fear of contaminating a stream if the wash water is to be discharged therein. The aqueous treating solution is continuously reconditioned and reused and substantially fully removes, reacts with or neutralizes the waste carry-over on a workpiece that is being moved continuously into an aqueous washing bath.

This invention relates to a continuous in-line procedure for treating iron salt carry-over on the surfaces of workpieces that have a ferrous metal content and that have been subjected to an acid type of treatment. The invention has particular application to making iron salt carry-over substantially fully innocuous by treating it with a calcium-containing aqueous chemical treating solution that is maintained in a condition such that undesirable calcium precipitation is avoided and iron precipitation products can be separated out from the solution, and the solution can be continuously supplied or maintained in a fully effective waste chemical neutralizing condition.

U.S. Patent No. 2,725,314 discloses an in-line treatment of toxic carry-over on workpieces which marked a distinct advance in the art, particularly from the standpoint of solutions used for plating metals, such as copper, brass, cadmium, zinc and alloys thereof. In carrying out the process, chlorine was used with a caustic hydroxide in a neutralizing wash solution. An excess of chlorine in the neutralizing chemical solution was employed to assure a full and complete making of the toxic material, as carried over on the workpieces, innocuous for direct sewer disposal. In this connection, an excess of chlorine with the caustic hydroxide such as sodium hydroxide was used to provide a treating solution having a pH of about 8.5 to 11. The chemical reactions of the treatment provided products, such as carbon dioxide, nitrogen gas, sodium chloride and sodium hydroxide. In treating a waste solution employed in chromium electropolishing, plating, etc., the process was more involved requiring two or three steps and first involving reduction of hexavalent chromium to trivalent by the use of sulfur dioxide gas.

The present invention deals particularly with a continuous in-line treatment of ferrous base metals and alloys from the standpoint of neutralizing or making innocuous acid and metal salt drag-out from an acid treatment or pickling step or process. In this connection, it was discovered that the in-line process of the above-mentioned patent could not be successfully followed where the drag-out was from an acid pickling or treating solution for a steel, stainless steel, iron or ferrous metal containing workpiece. One of the difficulties is that calcium compounds (the most economical source of alkali) resulted in precipitated lime salts that could not be settled completely, even in a separate tank, such as treatment solution reservoir E of the reference patent. In this connection, suspended lime and reacting excess lime in the treating solution precipitated on the workpieces, themselves, giving them a whitish lime and sometimes gypsum containing coating that was sufficiently adherent that it could not be washed off easily in a subsequent water rinse, such as represented by D of FIG. 1 of the patent.

Also, in endeavoring to employ an in-line treatment for such a ferrous metal waste carry-over or drag out, it was determined that precipitated iron oxide comes down in a very fine floc having a density about the same as water such that it cannot be settled easily. Further, it cannot be filtered out of the solution in view of the blinding nature of such hydroxides on a filtering media. An additional factor was the fact that automatic dosing of lime for neutralization and the maintenance of a desirable pH from a control standpoint was very difficult, since both dissolved and precipitated lime salts tend to coat the pH determining electrodes. Thus, undue frequent cleaning is a prerequisite.

The figure is a diagrammatic illustration of an exemplary integrated in-line treatment system or layout employed and arranged in accordance with the principles of the invention and as applied to the removal of acid pickling waste carry-over on ferrous metal workpieces.

In meeting the above factors and providing a highly efficient and effective in-line treatment which can be fully continuous from the standpoint of treatment of the drag-out from a toxic ferrous metal treating solution, it was discovered that it was necessary to avoid providing an excess of chemicals in the treatment solution and to avoid the presence of substantially unreacted calcium in an aqueous alkaline chemical treatment solution. A full reaction or neutralization of the toxic waste or drag-out can be accomplished after the carry-over contaminated solution leaves the bath B by maintaining a pH of the treating solution within the range of about 6 to 10. The correction of the solution pH is accomplished in a mixing bath or tank, such as represented by D of the drawings, by the addition of calcium, such as in the form of hydrated or slaked lime, $Ca(OH)_2$, or powdered limestone, $CaCO_3$, to the solution, see arrow 15. Within such criterion it was determined that an aqueous chemical treatment solution, as returned from a treating wash tank or bath (see B of the drawing) of a process line employed to neutralize the iron salt drag-out, contained no free in the sense of unreacted or dissolved calcium alkalinity, with the result that no lime precipitates were formed at the treating station or bath, such as would coat the workpieces, container, electrodes, etc. In this connection, the pH of the solution introduced into and removed from the treatment bath B is maintained below 8.

By heating the treating solution to a temperature within a range of about 160° F. to boiling (212° F.), preferably in the treating solution bath or tank B, precipitated iron salts were coalesced with the larger floc formed, settling faster and permitting the treatment solution to perform its function in an effective and improved manner. Agitation or oxygen bubbling in the tank or bath B within which the drag-out is being treated was found to provide a further improvement, on the basis that more iron salts were oxidized to the higher valent ferric state, such that they will precipitate at a lower pH and form a faster settling precipitate in the reservoir (see E of the drawing).

Briefly, therefore, the neutralizing solution pH is maintained within a range below that at which free lime or calcium alkalinity is present in the treatment solution, and care is taken to maintain the solution in the treating bath B below a maximum pH of 8. The alkaline solution in the tank F must thus be below a pH of 8. A chemical feeder can be monitored to the operation of a pH electrode system to hold the solution within a pH range that assures the absence of any free (unreacted or dissolved) calcium compound in the nature of calcium hydroxide or calcium carbonate. By way of example, a drag-out solution containing approximately 10% by weight of sulfuric acid and iron sulfate ($FeSO_4 \cdot 7H_2O$) in the range of 160 g./l. was successfully treated or fully reacted by a lime solution of the above-mentioned pH range 6 to 10 to accomplish the above-mentioned desired results.

In carrying out the invention, the acid pickling solution carry-over or drag-out from the chemical treating of a ferrous metal workpiece of work line 10, for example, a continuous workpiece that is being moved continuously in-line from an acid pickling bath or tank A, is removed by a treatment solution of bath B through which it passes and that has a pH of less than 8 for the successful carrying out of the process. In other words, the aqueous wash treatment solution should be nearly neutral, not above a pH of 8. To the aqueous chemical treatment bath or neutralizing solution for carrying out the process, calcium salts such as calcium hydroxide or carbonate are added to assure a pH within a range of 6 to 10 in which no free calcium alkalinity remains in solution. See mixng station or tank D and reservoir station or tank E. The solution is then re-introduced into treatment wash tank B after the settling operation in tank E, and applied to react with, neutralize and render innocuous, the waste solution carry-over or drag-out on surfaces of the workpiece. That is, the workpiece or pieces are moved continuously through an aqueous chemical treatment solution of bath B which reacts with the carry-over in such a manner as to completely neutralize it, make it innocuous and produce innocuous reaction products. Thus, workpieces may also move continuously into and through a fresh water rinse bath or zone C and thence, to a point where it is subjected to further treatment or to fabrication, etc. The used rinse water, being innocuous, may be discharged directly into the sewer.

The solution applied in treatment wash bath or tank B is circulated between such tank and treatment solution reservoir E where the pH content is checked to provide the solution in a workable condition for return to the treatment bath. Optimum results are obtained by bubbling air into the solution entering the treatment tank or bath B or by circulating the solution at a sufficient velocity to cause air agitation and air introduction, such as to make a further improvement from the standpoint of oxidizing iron salts into a high valence ferric state, precipitating at a lower pH, and forming a fast settling precipitate. An important feature of the disclosure rests in the discovery that, by controlling the pH, the full reaction of the acid salt and waste drag-out is accomplished without the use of excess quantities of the reacting or neutralizing chemicals in the solution. This, in turn, makes the process practical from the standpoint of avoiding slow-settling, iron-floc, and lime-precipitation.

In the layout shown in the figure, A represents a final, acid-pickling, solution-containing tank or bath of a process line for iron or steel workpieces, such as represented by the work line 10. It will be noted that the workpiece line 10, which may be a series of suspended workpieces or a continuous strip or sheet, is moved in the direction of the arrows successively and continuously from bath or tank A into and through treatment chemical wash solution of a treating tank or bath B, and into and through a water rinse of a tank, bath or zone C. The solution in tank or bath B is maintained at an elevated temperature within a range of 160° to 212° F. and at an optimum of about 170° F., and is employed to remove iron waste carry-over on the workpiece line 10.

A heating coil 11 is shown suspended within the solution of bath B and as having a hot steam inlet 11a and a cold steam or water outlet 11b. Carry-over from the aqueous treatment solution of tank B to the tank C on the workpieces of line 10 is innocuous, such that the rinse water of C may be directly discharged from an overflow 21 to a sewer connection or pipe 22.

In carrying out the process, it will be noted from the figure that care must be taken to ensure that the pH of the carry-over from the solution A into solution B is less than 8. The solution supplied to the bath B contains no free (dissolved, unreacted or excess) calcium compound. However, the solution of B which has been used to wash-off the carry-over on the workpieces of the line 10 is taken-off by an overflow 12 through line 13 and introduced into mixing and chemical additive tank or bath D. In the tank D, a mixer, represented diagrammatically in the figure by a motor driven propeller unit 14, is shown used to mix calcium hydroxide that is supplied, as indicated by the arrow 15, to bring the pH of the solution within a range of 6 to 10, and, as an optimum, of within the range of about 6 to 8, as determined by a pH probe 16 suspended within a tank or precipitation reservoir E. It has been determined that below a pH of 10, there is no free calcium alkalinity. It will be noted that when sulfuric acid is present in the pickling bath and thus in the carry-over, calcium sulfate and ferric and ferrous hydroxides are precipitated-out in the tank E. Reconstituted solution, as overflow from the tank E, then moves into a collecting tank F where the final pH may be checked and any corrections made and from which the solution is moved through line 19 by pump 20 to return as a renewed aqueous chemical treatment solution to the tank B. Excess solution may be removed from the tank F by overflow 17 and a pipe 18 leading to a waste disposal.

The workpiece line 10, after moving through the bath B, is shown introduced into water rinse tank C and, on leaving such tank, may be led-off for storage prior to shipping or for further processing or shaping.

Although the invention has been described particularly from the standpoint of use of a calcium chemical such as lime, it will be appreciated that other treating chemicals may be employed as additions in the solution if desired, such as wetting agents, accelerating agents, etc., without departing from the spirit and scope of the invention as set forth in the claims.

I claim:

1. In an integrated in-line process for removing iron salt waste and acid carry-over from ferrous metal workpieces that have been subjected in-line to an acid treating bath, preparing and maintaining a wash solution bath having an aqueous wash treatment solution, continuously moving the workpieces in-line from the acid treating bath into and through the wash solution bath while continuously moving the wash treatment solution through the bath, and within the bath applying the wash treatment solution directly to surfaces of the workpieces and washing-off the carryover therefrom while maintaining the treatment solution of the bath within a temperature range of 160° to 212° F., thereafter moving the workpieces into and through a water rinse bath, continuously taking-off the treatment solution having the waste carry-over therein from the wash solution bath and passing it into and through a conditioning reservoir, introducing calcium ions in the form of calcium compounds selected from the group consisting of calcium carbonate and calcium hydroxide into the solution after its removal from the treating bath and before its removal from the reservoir, precipitating and settling out iron salts and calcium compounds within the reservoir while maintaining a pH of 6 to 10 of the treatment solution therewithin, continuously taking-off, enriching, returning and reusing the treatment solution by a circulating movement thereof between the wash solution bath and the conditioning reservoir while maintaining a pH of less than 8 within the treatment solution as resupplied to the wash solution bath and as utilized within such bath for washing-off the carry-over, maintaining the treatment solution during its introduction into and application to surfaces of the workpieces within the wash treatment bath in an alkaline condition without the presence of a free amount of a calcium compound of the above-mentioned group that will form a calcium containing deposit on surfaces of the workpieces within the bath, and moving the treatment solution through the wash solution bath in such a manner as to substantially completely remove the iron salt waste and acid carry-over from the surfaces of the workpieces into the treating solution without forming a whitish calcium containing deposit on the workpieces.

2. In a process as defined in claim 1, introducing air into the treatment solution to facilitate oxidation of the iron salt content thereof.

3. In a process as defined in claim 1, adding the calcium compound to the treatment solution in a sufficient amount to only assure its alkalinity and avoid the presence of free, unreacted or dissolved calcium being returned to the wash solution bath.

4. In a process as defined in claim 3, adding the calcium compound to the treatment solution within a mixing tank after its removal from the wash treatment bath and before its introduction into the conditioning reservoir.

5. In a process as defined in claim 4, applying an agitated mixing action to the solution within the mixing tank.

6. In a process as defined in claim 5, bubbling the air through the treatment solution within the wash solution bath while applying it to surfaces of the workpieces.

References Cited

UNITED STATES PATENTS

| | | | |
|---|---|---|---|
| 1,269,443 | 6/1918 | Hoffman | 134—13 |
| 2,692,229 | 10/1954 | Heise et al. | 210—60X |
| 2,725,314 | 11/1955 | Lancy | 134—13 |
| 3,310,435 | 3/1967 | Robinson et al. | 134—41X |

OTHER REFERENCES

Weiner, Robert: "Effluent Treatment in the Metal Finishing Industry," pp. 16, 83, 90, 91, 93, 94, 96, 97, 98, 151, 152 (1963).

Parsons, W. A.: "Chemical Treatment of Sewage and Industrial Wastes," pp. 28–32, 82–85 (1965).

JOSEPH SCOVRONEK, Primary Examiner

D. G. MILLMAN, Assistant Examiner

U.S Cl. X.R.

134—28, 41; 210—60